US012625614B2

(12) United States Patent
Nandanwar et al.

(10) Patent No.: US 12,625,614 B2
(45) Date of Patent: May 12, 2026

(54) CHARGE-SENSITIVE DRAM ACCESS TIMING CONTROL

(71) Applicant: QUALCOMM INCORPORATED, San Diego, CA (US)

(72) Inventors: Darshan Kumar Nandanwar, Bangalore (IN); Sanku Mukherjee, Bangalore (IN); Arvind Garg, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 223 days.

(21) Appl. No.: 18/535,478

(22) Filed: Dec. 11, 2023

(65) Prior Publication Data

US 2025/0190113 A1     Jun. 12, 2025

(51) Int. Cl.
*G06F 3/06* (2006.01)

(52) U.S. Cl.
CPC .......... *G06F 3/0611* (2013.01); *G06F 3/0659* (2013.01); *G06F 3/0673* (2013.01)

(58) Field of Classification Search
CPC ................................................ G11C 11/40611
See application file for complete search history.

(56) References Cited

U.S. PATENT DOCUMENTS

| | | | | |
|---|---|---|---|---|
| 9,239,355 | B1 * | 1/2016 | Burstein | G11C 29/16 |
| 12,308,069 | B2 * | 5/2025 | Van Der Veen | |
| | | | | G11C 11/40611 |
| 2001/0056521 | A1 * | 12/2001 | Fujiwara | G11C 29/70 |
| | | | | 711/167 |
| 2015/0221358 | A1 * | 8/2015 | Brandl | G06F 13/1668 |
| | | | | 711/167 |
| 2024/0079042 | A1 * | 3/2024 | Ahn | G11C 11/40611 |

* cited by examiner

*Primary Examiner* — Hoai V Ho
*Assistant Examiner* — Anthony Thinh Tang
(74) *Attorney, Agent, or Firm* — Smith Tempel Blaha LLC

(57) ABSTRACT

DRAM access timing may be controlled based on charge remaining in cells of a DRAM row. DRAM timing and thus latency may be reduced in instances in which repeated row accesses are directed to the same row within an amount of time during which the row cell capacitances remain highly charged. In response to a row precharge, the row address may be stored in a table. Then, in response to a row activation and subsequent read/write access, a first timing parameter may be used in accessing the row when the row is in the table, and a second timing parameter may be used in accessing the row when the row is not in the table. Entries in the table may be periodically invalidated to reflect charge loss.

14 Claims, 5 Drawing Sheets

CHARGE-SENSITIVE DRAM ACCESS TIMING CONTROL

DESCRIPTION OF THE RELATED ART

Dynamic random access memory (DRAM) may be included in a wide variety of computing devices. A DRAM stores a representation of a data bit in the form of a charge on a capacitance. A DRAM has an array, i.e., rows and columns, of cells where each cell includes such a capacitance. Absent any intervention, the charge would tend to gradually leak, resulting in data loss. A refresh operation is an activation of a row that may be performed periodically to re-charge the cell capacitances and thus prevent data loss. A row also may be activated when the row is accessed to write or read data, similarly re-charging the capacitances.

The amount of time between a memory controller activating a DRAM row and data being written to or read from the row following that row activation is commonly referred to as DRAM latency. High DRAM latency may be a memory system bottleneck, adversely impacting memory system performance and thus overall computing device performance. It would be desirable to reduce DRAM latency in a memory system.

SUMMARY OF THE DISCLOSURE

Systems, methods, and other examples for controlling dynamic random access memory (DRAM) access timing are disclosed.

An exemplary method for controlling DRAM access timing may include storing, based on row precharging, an address of the precharged row in a location in a table. The method may further include determining, based on row activating, whether an address of the activated row is in the table. The method may yet further include using a first timing parameter to access the activated row when the address of the activated row is in the table, and using a second timing parameter to access the activated row when the address of the activated row is not in the table.

An exemplary system for controlling DRAM access timing may include a DRAM command manager and a table having locations configured to store DRAM row addresses. The DRAM command manager may be configured to detect precharge, activate, and read/write commands. In response to detecting a precharge command, the DRAM command manager may be configured to store the address of the precharged row in a location in the table. In response to detecting an activate command, the DRAM command manager may be configured to determine whether the address of the activated row is in the table. Also in response to detecting a read/write command, the DRAM command manager may be configured to use a first timing parameter to access the activated row when the address of the activated row is in the table, and to use a second timing parameter to access the activated row when the address of the activated row is not in the table.

An exemplary DRAM controller may include a DRAM storage array. The DRAM controller may also include a command generator configured to generate DRAM commands including precharge commands, activate commands, and read/write commands. The DRAM controller may include a table configured to store DRAM row addresses and a DRAM command manager configured to detect DRAM commands generated by the command generator. In response to detecting a precharge command, the DRAM command manager may be configured to store an address of the precharged row in a location in the table. In response to detecting an activate command, the DRAM command manager may be configured to determine whether the address of the activated row is in the table. In response to detecting a read/write command, the DRAM command manager may be configured to use a first timing parameter to access the activated row when the address of the activated row is in the table, and to use a second timing parameter to access the activated row when the address of the activated row is not in the table.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
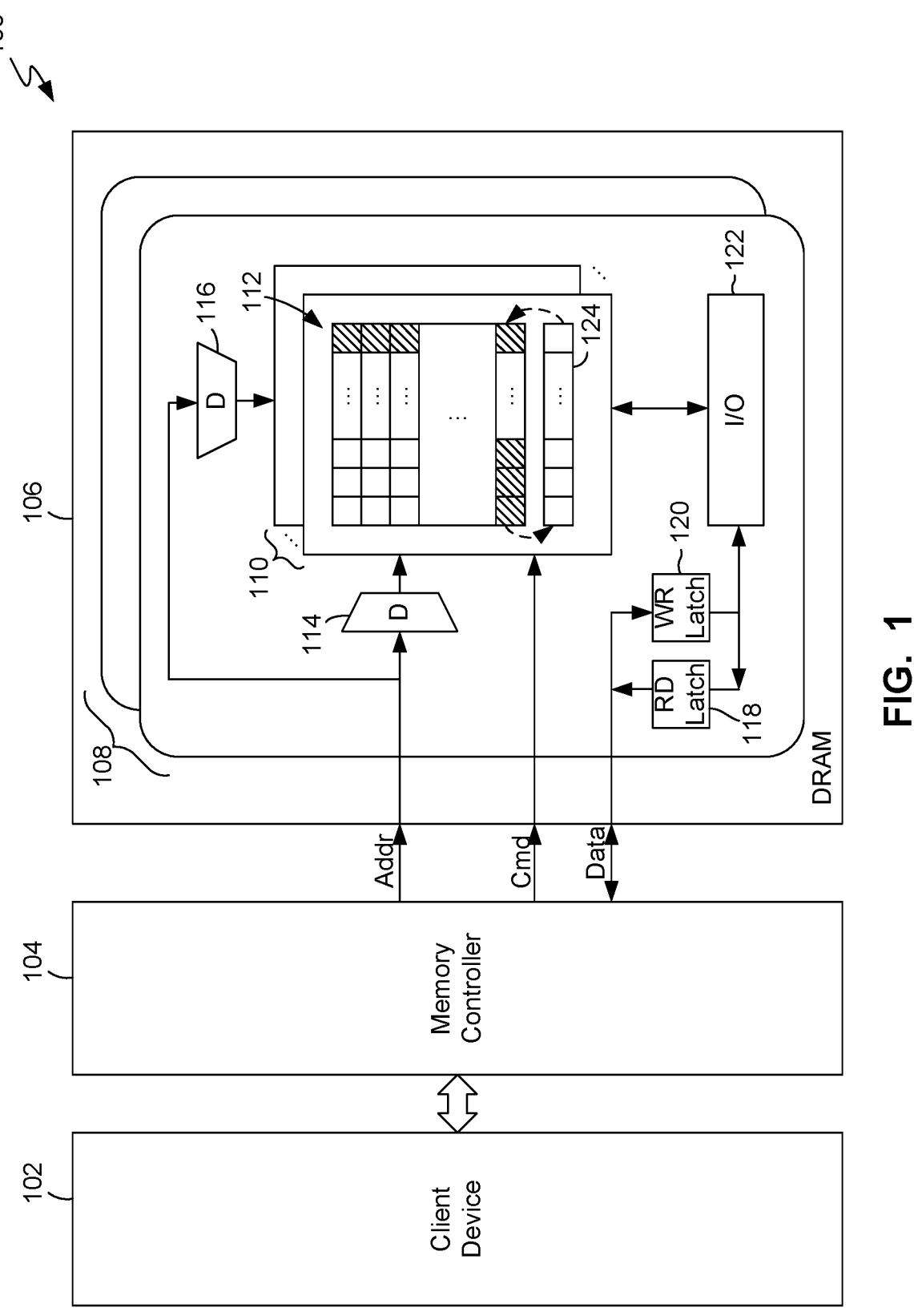
FIG. 1 is a block diagram of a portion of a computing system having a feature for controlling DRAM access timing, in accordance with exemplary embodiments.

As shown in FIG. 1, in an illustrative or exemplary embodiment a system 100 may include a client device 102, a memory controller 104, and a dynamic random access memory (DRAM) 106. As described below, the memory controller 104 (which may also be referred to as a DRAM controller 104) may include features for reducing DRAM latency.

The client device 102 may be a processor or portion thereof, such as, for example, a central processing unit (CPU), graphics processing unit (GPU), digital signal processor (DSP), neural processing unit (NPU), or a processing core of such a processor, etc. The client device 102 may be included in a "system-on-a-chip" or "SoC" (not shown). In some examples of the system 100, the memory controller 104 may be included in such an SoC with the client device 102. The DRAM 106 may be coupled to the SoC or, in some examples, included in the SoC along with the DRAM controller 104.

The client device 102 may issue DRAM transaction requests that may include read requests, i.e., requests to read data from the DRAM 106, and write requests, i.e., requests to store data in the DRAM 106. The DRAM transaction requests may also be referred to as requests to access the DRAM 106. Each DRAM transaction request may include a target address in the DRAM 106, a size or amount of data to be accessed, and other information. A write request also includes the data to be stored in the DRAM 106 in response to the write request.

The memory controller 104 may translate the transaction requests into DRAM commands ("Cmd") and physical DRAM addresses ("Addr") and provide the commands and addresses to the DRAM 106. The memory controller 104 may queue the transaction requests and, using a scheduling algorithm, provide the associated commands and addresses to the DRAM 106 in a determined order and in accordance with DRAM timing specifications.

The DRAM 106 may be of any type not inconsistent with the descriptions herein. For example, the DRAM 106 may be a double data rate synchronous DRAM ("DDR-SDRAM"), sometimes referred to for brevity as "DDR."

The DRAM 106 may be organized in ranks 108 and banks 110. For example, the DRAM 106 may comprise two ranks 108, each comprising two or more banks 110. Each bank 110 is organized as a two-dimensional storage array 112 of cells or storage locations, where a cell in the storage array 112 may be accessed by selecting its row and its column. An exemplary row and an exemplary column of the storage array 112 are highlighted in cross-hatch in FIG. 1 for purposes of illustration. A row's signal line may be referred to as a wordline. A column's signal line may be referred to as a bitline. A cell's electrical charge represents a stored data bit value, i.e., a "1" or a "0". The storage array 112 may have any number of rows, such as, for example, 16 k, 32 k, etc.

The physical addresses by which the memory controller 104 accesses the DRAM 106 may include row addresses, column addresses, bank addresses, etc. For example, in response to a row address provided by the memory controller 104, a row address decoder (D) 114 may select one of the rows in a selected bank 110 in a selected rank 108. Similarly, in response to a column address provided by the memory controller 104, a column address decoder (D) 116 may select one of the columns in a selected bank 110 of a selected rank 108.

Each rank 108 may have a read (RD latch 118 to buffer the read data, and a write (WR) latch 120 to buffer the write data. Read data may be detected by sense amplifiers (not shown) coupled to the bitlines. Each rank 108 may also have input/output (I/O) circuitry 122 configured to direct the read and write data from and to selected memory locations.

Each bank 110 may have a row buffer 124. The row buffer 124 stores the contents of a selected or "activated" row. A row must be activated before it may be written to or read from. The DRAM 106 activates a row (also referred to as opening a row) in response to an activate (ACT) command. More specifically, in response to an ACT command directed to a row the DRAM 106 stores the contents of that row in the row buffer 124. Once a row is activated in this manner, the DRAM 106 may read from or write to any number of columns in the row buffer 124 in response to read or write commands, also referred to as column address select (CAS) commands. Following a read or write command, the data is transferred serially between the memory controller 104 and DRAM 106 in units known as a "burst," which may be, for example, eight bits per data signal line. The row must be restored (also referred to as closing a row) after writing to or reading from the row buffer 124. The DRAM 106 closes a row in response to a precharge (PRE) command.

Figure 2:
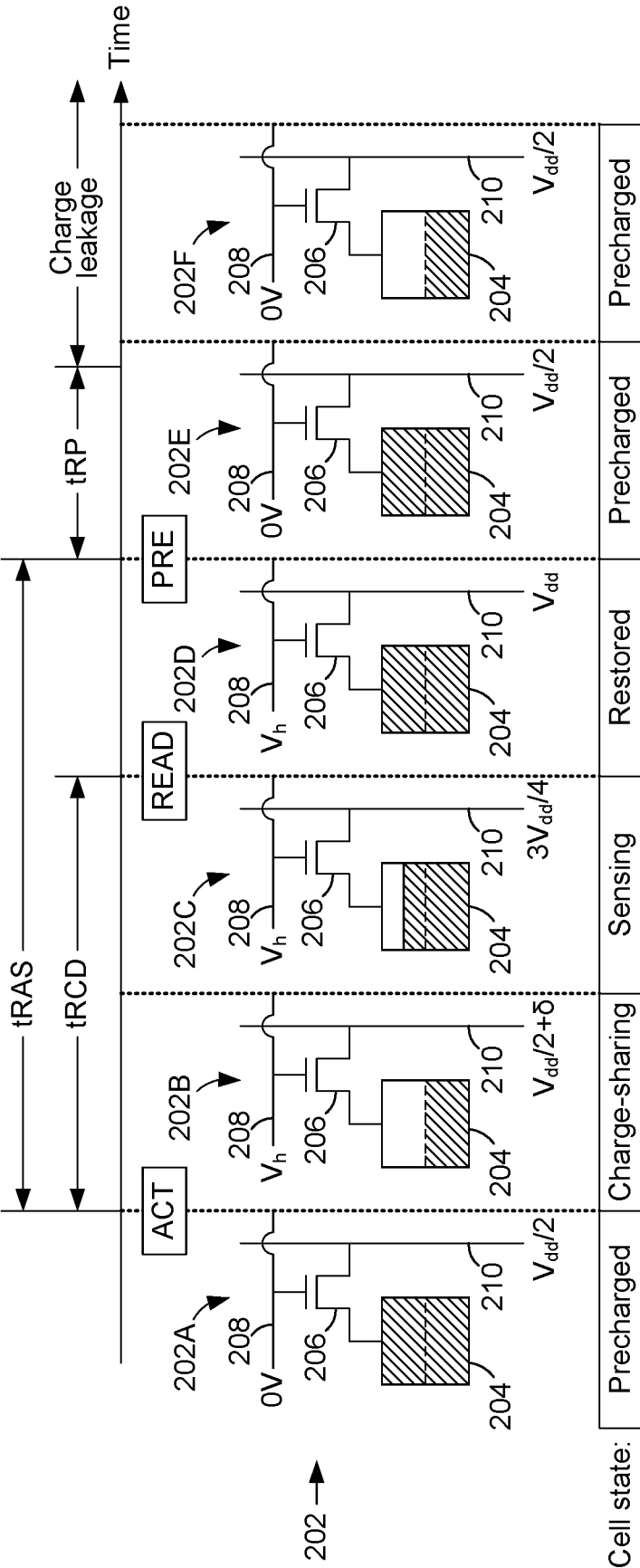
FIG. 2 is a diagram showing the effects on a DRAM cell of commands relating to a read operation over a time interval, in accordance with exemplary embodiments.

In FIG. 2, the effects of the above-described commands on an exemplary DRAM cell 202 are shown in the context of a read operation. The cell 202 may comprise a capacitance 204 and a control transistor 206. The capacitance 204 is depicted in a conceptual manner, with its charge level indicated in cross-hatch. The cell's wordline 208 and bitline 210 are also shown. In FIG. 2, the same cell 202 is shown in successive states 202A, 202B, 202C, 202D, 202E, and 202F (i.e., at successive times) as the read operation progresses.

In an initial state 202A, the capacitance 204 has been fully charged to a voltage level of Vdd, where "Vdd" represents a supply voltage level. The wordline 208 is at a voltage level of 0V, and the control transistor 206 has thereby disconnected the bitline 210 from the capacitance 204. In the initial state 202A, the bitline 210 has been "precharged" or set to a voltage level of Vdd/2 in preparation for a data access (i.e., read or write operation).

Following the state 202A, the memory controller 104 (FIG. 1) may issue an activate (ACT) command. The ACT command begins the next state 202B. In response to the ACT command, the wordline 208 is increased from 0V to a voltage level Vh, where "Vh" represents a voltage level greater than 0V. In response to this increase of the wordline voltage, the control transistor 206 connects the capacitance 204 to the bitline 210. As the capacitance 204 in the state 202B is at a higher voltage than the bitline 210, charge flows from the capacitance 204 to the bitline 210, thereby raising the voltage level on the bitline to Vdd/2+δ, where "δ" (the Greek letter delta) represents an increment or deviation. The state 202B is commonly referred to as "charge-sharing."

In a state 202C following the state 202B, the sense amplifier (not shown) on the bitline 210 detects the voltage deviation δ and amplifies it. This process, commonly referred to as sense amplification, drives the bitline 210 and thus the capacitance 204 to a voltage level corresponding to the original state of the cell prior to activation, which in the illustrated example is Vdd. A time interval commonly referred to as "tRCD" represents the amount of time between the ACT command and the sense amplification providing a readable data bit. In other words, after issuing the ACT command the memory controller 104 (FIG. 1) must wait a time interval of tRCD before issuing a READ command. When the bit is ready to be read, the charge on the capacitance 204 may be, for example 3Vdd/4. The value of tRCD may be specified by the DRAM manufacturer.

When sense amplification is complete, the bitline 210 and the capacitance 204 are both at a voltage level of Vdd. This state 202D is commonly referred to as "restored" because the capacitance 204 is fully restored to its original charge level of Vdd. The amount of time between the ACT command and restoration of the capacitance 204 to its original charge level is commonly referred to as "tRAS." The value of tRAS may be specified by the DRAM manufacturer.

Following the state 202D, the memory controller 104 (FIG. 1) may issue a precharge (PRE) command before accessing a different row. In this state 202E, the wordline 208 is decreased from Vh to 0V in response to the PRE command. In response to this decrease of the wordline voltage, the control transistor 206 disconnects the capacitance 204 from the bitline 210. Further in response to the PRE command, the bitline 210 is set or precharged to a voltage level of Vdd/2. The amount of time taken by the precharge operation, i.e., for the capacitance 204 to be disconnected from the bitline 210 and for the bitline 210 to then be set to a voltage of Vdd/2, is commonly referred to as "tRP." At the completion of the precharge operation the cell 202 is in a state 202F.

In the state 202F, the capacitance 204 will gradually leak charge. Absent a timely refresh operation or another access (i.e., read or write operation) of the row, the cell 202 would lose the stored bit value represented by the charge on the capacitance 204.

The solutions described herein recognize that a subsequent access of a more recently accessed row can be performed faster than a subsequent access of a less recently accessed row, because a more recently accessed row has more charge than a less recently accessed row. That is, DRAM latency is inversely related to the amount of charge remaining in the DRAM cells being accessed. As described below, the solutions leverage this recognition by tracking the addresses of recently accessed rows and using reduced timing parameters (tRCD, tRAS, etc.) to access recently accessed rows.

Figure 3:
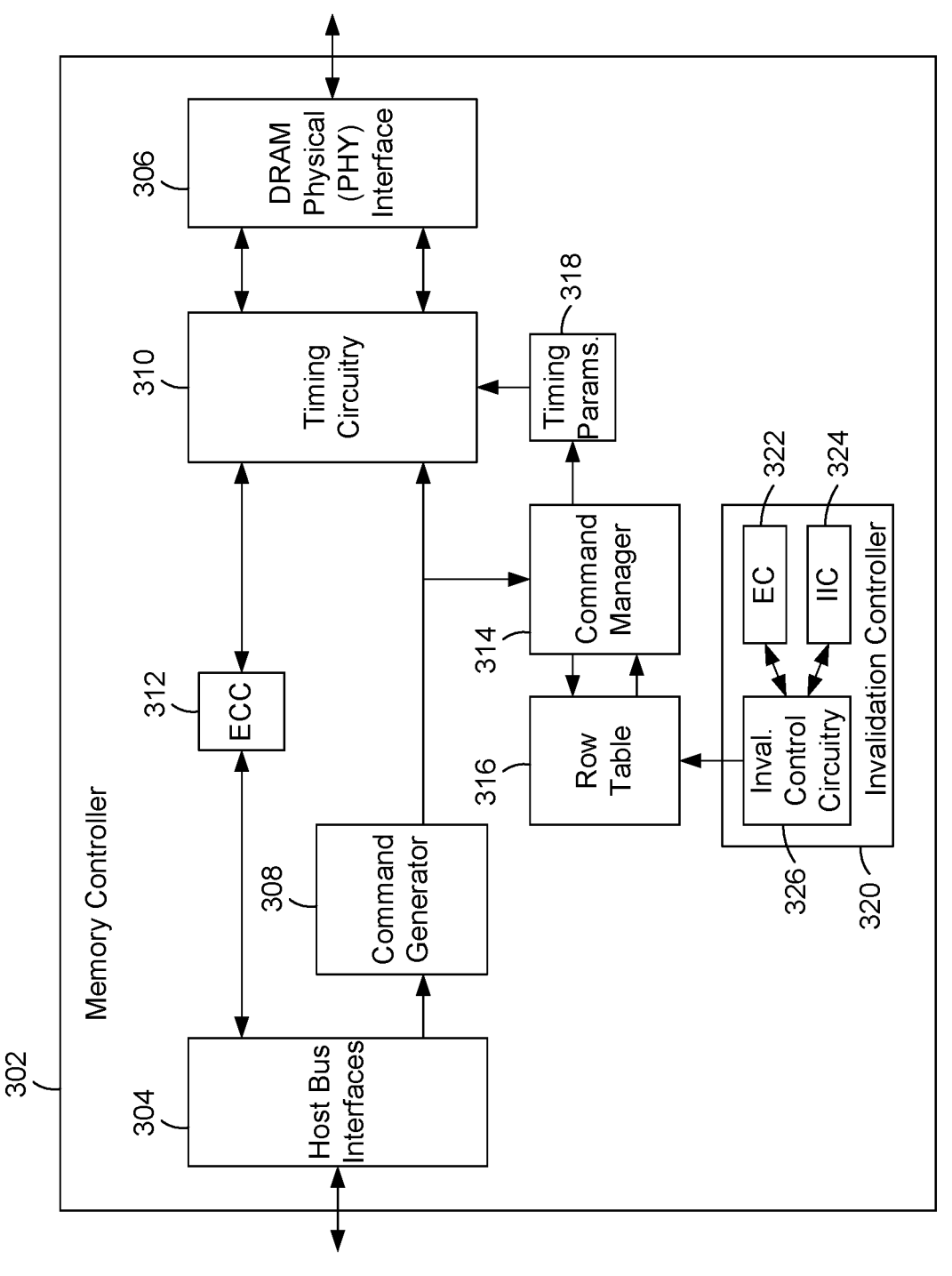
FIG. 3 is a block diagram of a memory controller, in accordance with exemplary embodiments.

In FIG. 3, an example of a memory controller 302 is shown in block diagram form. The memory controller 302 may be an example of the above-described memory controller 104 (FIG. 1). Accordingly, the memory controller 302 may include host bus interfaces 304, configured to be coupled to, for example, the above-described client device 102 (FIG. 1), and a DRAM physical interface or "PHY" 306 configured to be coupled to, for example, the above-described DRAM 106 (FIG. 1). Coupled between the host bus interfaces 304 and DRAM PHY 306 may be various memory controller components, such as a command generator 308 and timing circuitry 310. Error-correcting code (ECC) circuitry 312 may also be included in the data path between the host bus interfaces 304 and the timing circuitry 310. Still other circuitry that may be included in the memory controller 302 but which is not shown in FIG. 2 for purposes of clarity may include various buffers, such as first-in-first-out ("FIFO") data buffers, control and status registers, etc.

In translating a read request or write request, the command generator 308 may determine commands needed to fulfill the request. For example, in translating a read request the command generator 308 may provide the ACT, READ, and PRE command sequence described above with regard to FIG. 2. The command generator 308 or related circuitry (not shown for purposes of clarity) may also provide address information identifying the locations in the DRAM 106 (FIG. 1) from which data may be read and which may include row and column addresses, bank, rank, etc. The timing circuitry 310 may receive such commands and addresses from the command generator 308 or related circuitry, adjust or set the timing among such information, and provide the information to the PHY 306 in accordance with such timing. The timing may be based on timing parameters including tRCD and tRAS, as described above with regard to FIG. 2. In association with write requests the timing circuitry 310 may also receive data (e.g., from the ECC circuitry 312), and may adjust or set the timing among command, address and data information provided to the PHY 306.

In accordance with a feature of the solutions described herein, the timing circuitry 310 may select between two sets of timing parameters: a first set of timing parameters that may be used in read or write transactions when the transactions are directed to rows that have been recently accessed, and a second set of timing parameters that may be used in read or write transactions when the transactions are directed to rows that have not been recently accessed. A row that is referred to as "recently accessed" may also be referred to as "highly charged," meaning that the capacitances of the row's cells may remain above a threshold amount of charge. Whether a row is recently accessed (or highly charged) may be based on a time interval, such as the time interval between a row's activation and a subsequent access (i.e., read or write) of that row based on that activation. The following components provide an example of circuitry that may provide the foregoing feature.

The memory controller 302 may include a command detector or manager 314 and a row table 316 (which may also be referred to as a highly-charged row (HCR) table). Although the term "table" is used herein for convenience, the row table 316 may comprise any type of data storage structure, in any data storage medium. In the memory controller 302, the row table 316 may be provided, for example, in a static RAM (not separately shown).

Figure 4:
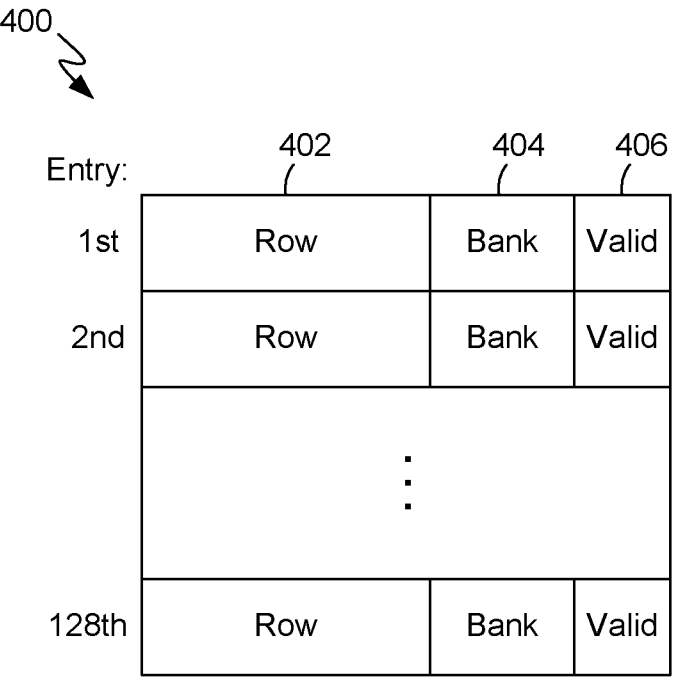
FIG. 4 illustrates an exemplary highly-charged row (HCR) table, in accordance with exemplary embodiments.

Referring briefly to FIG. 4, a row table 400 is shown that may be an example of the row table 316 (FIG. 3). An entry in the row table 400 may also be referred to as a location in the row table 400. The row table 400 may include any number of entries or locations, such as, for example, 128 (i.e., a "1st" entry, a "2nd" entry, through a "128th" entry). Each entry may be configured to store information identifying a DRAM row address 402, a DRAM bank address 404, and a Valid bit 406 indicating whether the entry is valid. The term "valid," as indicated by the value of the Valid bit 406 in an entry, means that the DRAM row identified by the DRAM row address 402 and bank 404 of that entry has been recently accessed (or remains highly charged).

Referring again to FIG. 3, the command manager 314 may be configured to detect ACT, PRE, and access commands directed to a row. An access command, which may be either a READ command or a WRITE command, may also be referred to as a READ/WRITE command. The command manager 314 may be configured to store an address of the precharged row in the row table 316 when the command manager 314 detects the PRE command. The command manager 314 may be configured to determine whether the address of the activated row is in the row table 316 when the command manager 314 detects the ACT command. For convenience, a row address 402 may be referred to as being "in" the table when the Valid bit 406 of the table entry containing that row address 402 is set to a state (e.g., "1") indicating that entry is valid. Conversely, a row address 402 may be referred to as not being "in" the table when the Valid bit 406 of the table entry containing that row address 402 is set to a state (e.g., "0") indicating that entry is not valid.

Upon detecting a READ/WRITE command, the command manager 314 may be configured to use a first timing parameter (and not use a second timing parameter) to access the activated row when the command manager 314 determines (by examining the Valid bit) that the address of the activated row is in the row table 316, and to use the second timing parameter (and not use the first timing parameter) to access the activated row when the command manager 314 determines that the address of the activated row is not in the row table 316.

A timing parameter table 318 may be configured to store two sets of timing parameters. The timing parameters may be per-bank. That is, the timing parameters may differ based on which bank is being accessed. One of the two timing parameter sets may comprise at least one first timing parameter, and the other of the two timing parameter sets may comprise at least one second timing parameter. For example, a first timing parameter set may comprise a first value of tRCD, and the second timing parameter set may comprise a second value of tRCD. Alternatively, or in addition, the first timing parameter set may comprise a first value of tRAS, and the second timing parameter set may comprise a second value of tRAS.

For example, when the activated row is in the row table 316 the first value of tRCD may be used to access the row, and when the activated row is not in the row table 316 the second value of tRCD may be used to access the row. In a read access of a row in the table (i.e., a highly charged row), the first value of tRCD may be smaller than the second value of tRCD because the sense amplifiers (not shown) may produce outputs correctly indicating the stored bit values more quickly than if the row were not highly charged. In a read access of a row not in the table (i.e., not a highly charged row), the sense amplifiers may require an amount of time indicated by the second value of tRCD to produce outputs correctly indicating the stored bit values.

Likewise, when the activated row is in the row table 316 a first value of tRAS may be used in precharging the row following accessing the row. When the activated row is not in the row table 316 a second value of tRAS may be used in precharging the row following accessing the row.

In other words, the first timing parameter may comprise a shorter time interval between a row activation and a row read/write access (i.e., a shorter tRCD), and the second timing parameter may comprise a longer time interval between the row activation and the row read/write access (i.e., a longer tRCD). Alternatively, or in addition, the first timing parameter may comprise a shorter time interval between activating a row and precharging the row (i.e., a shorter tRAS), and the second timing parameter may comprise a longer time interval between activating the row and precharging the row (i.e., a longer tRAS). Note that the terms "shorter time interval" and "longer time interval" are used for convenience only to indicate amounts of time relative to each other and not to indicate absolute amounts of time such as a particular number of seconds.

The memory controller 302 may further include an invalidation controller 320 configured to invalidate each entry or location in the row table 316 after a time interval. For example, the invalidation controller 320 may be configured to invalidate each entry in the row table 316 every C processor cycles, where C is a number corresponding to an amount of time a precharged row remains highly charged (i.e., charged above a threshold level that enables a reduced timing parameter to be used as described above). The processor to which such processor cycles relate may be the client device 102 (FIG. 1) that initiates the DRAM transactions.

The invalidation controller 320 may comprise, for example, an entry counter (EC) 322, an invalidation counter 324 (which may also referred to as an invalidation interval counter or "IIC"), and invalidation control circuitry 326. The entry counter 322 may be configured to maintain a count that points to or indicates an entry or location in the row table 316. The invalidation counter 324 may be configured to maintain an invalidation interval count and to increment the invalidation interval count on each processor cycle. The invalidation control circuitry 326 may be configured to compare the incremented invalidation interval count with the value C/k, where k is the number of entries or locations in the row table 316. Note that k=128 in the table example (FIG. 4) described above. When the invalidation control circuitry 326 determines that the invalidation interval count has reached C/k, the invalidation control circuitry 326 may invalidate (i.e., set the Valid bit to a state indicating invalid) the entry or location in the row table 316 indicated by the entry counter 322. After invalidating that entry or location in the row table 316, the invalidation control circuitry 326 may increment the entry counter 322 and reset the invalidation counter 324 to zero.

Figure 5:
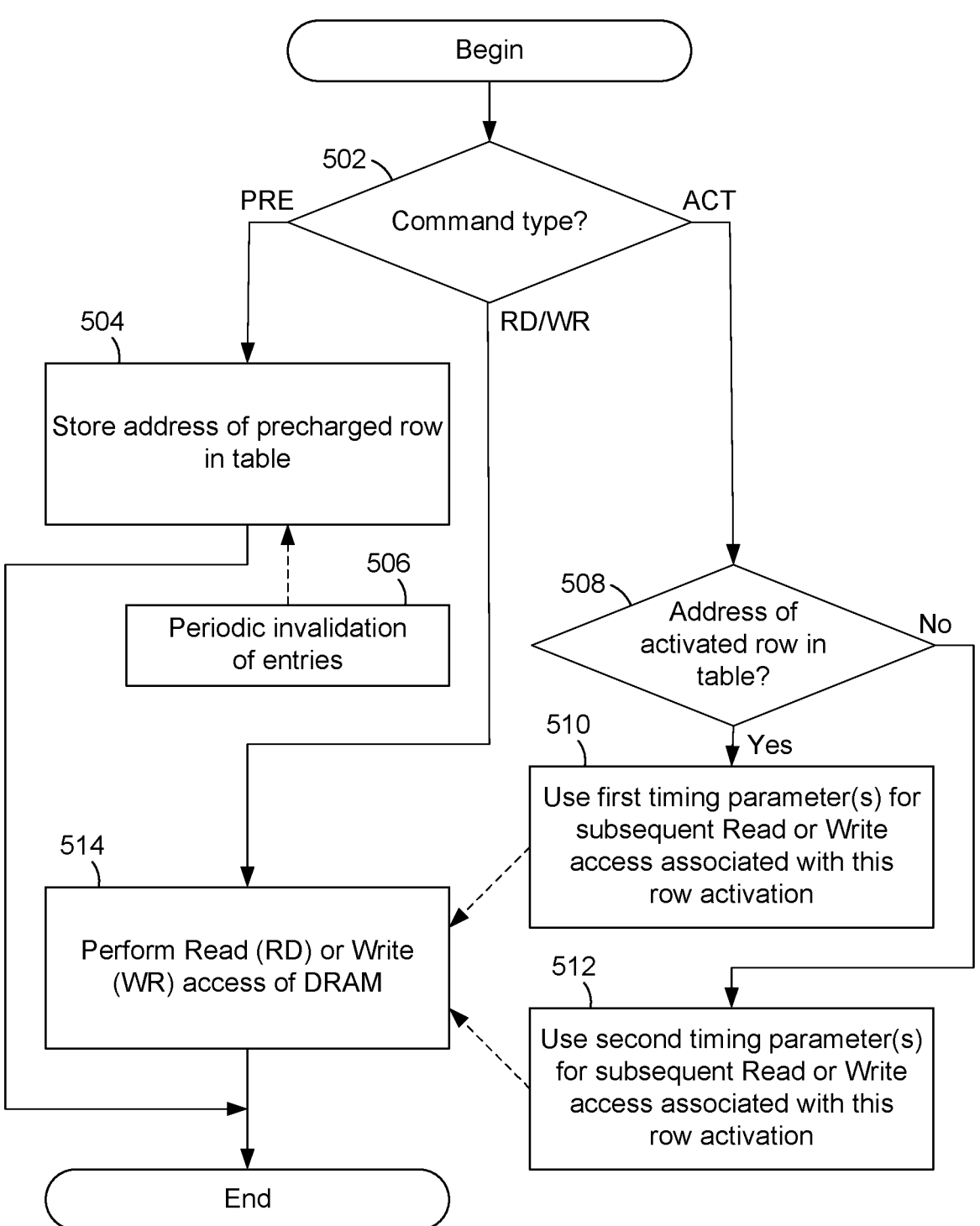
FIG. 5 is a flowchart illustrating a method for controlling DRAM access timing, in accordance with exemplary embodiments.

In FIG. 5, a method 500 for controlling DRAM access timing is illustrated in flow diagram form. Although the method 500 is described in the form of blocks indicating various operations in an order conducive to understanding an example, it should be understood that in other examples the operations may occur in other orders, and that in some examples operations may be omitted or additional operations not described herein may be included.

As indicated by block 502, the method 500 may include determining whether a DRAM command is an activation command (ACT), a precharge command (PRE), or an access command (READ/WRITE). As indicated by block 504, when it is determined that the command is a precharge command, thus indicating precharging of a DRAM row, the address of the precharged row may be stored in a location in a table. The above-described row table 316 (FIG. 3) or 400 (FIG. 4) may be an example of this table referred to in the method 500. As indicated by block 506, the address of the precharged row may be invalidated in the table after a time interval. Note that block 506 is not intended to indicate an operation performed immediately following storing the address of the precharged row in the table (block 504) but rather an operation that may be performed periodically, at any time with respect to block 504. As described above with regard to FIG. 3, such periodic invalidation may comprise, for example, invalidating the address of the precharged row in the table after a time interval after the precharging.

As indicated by block 508, when it is determined that the command is an activate command, thus indicating activation of a DRAM row, it may then be determined whether the address of the activated row is in the table. As indicated by block 510, when it is determined that the address of the activated row is in the table, a first timing parameter may be used to access the activated row. However, when it is determined that the address of the activated row is not in the table, a second timing parameter may be used to access the activated row, as indicated by block 512. This access of the activated row using either the first timing parameter or the second timing parameter is indicated by block 514, when it is determined that the command is an access (i.e., READ/WRITE) command.

Note that the above-described method 500 is directed to a single command. As further commands are generated in the memory controller, the method 500 may be applied to each command.

In the manner described above, DRAM latency may be reduced in instances in which repeated row accesses are directed to the same row within a threshold amount of time during which the row cell capacitances remain highly charged. A table or other data storage structure may be used to track which rows remain highly charged.

Implementation examples are described in the following numbered clauses.

1. A method for controlling dynamic random access memory (DRAM) access timing, comprising:

storing, based on row precharging, an address of a precharged row in a location in a table;

determining, based on row activating, whether an address of an activated row is in the table;

using a first timing parameter and not a second timing parameter to access the activated row in response to a determination the address of the activated row is in the table; and using the second timing parameter and not the first timing parameter to access the activated row in response to a determination the address of the activated row is not in the table.

2. The method of clause 1, wherein the first timing parameter is a shorter time interval between a row activation and a row precharge, and the second timing parameter is a longer time interval between the row activation and the row precharge.

3. The method of clause 1 or 2, wherein the first timing parameter is a shorter time interval between a row activation and a row read/write access, and the second timing parameter is a longer time interval between the row activation and the row read/write access.

4. The method of any of clauses 1-3, further comprising invalidating the address of the precharged row in the table after a time interval.

5. The method of clause 4, wherein invalidating comprises invalidating each location in the table every C processor cycles, where C is a number corresponding to an amount of time the precharged row remains charged above a threshold.

6. The method of clause 5, wherein invalidating comprises:

incrementing an invalidation interval count of an invalidation interval counter on each processor cycle;

determining whether the invalidation interval count is equal to C/k, wherein the table consists of k locations; and in response to determining the invalidation interval count is equal to C/k, invalidating the location in the table indicated by an entry count of an entry counter, incrementing the entry counter after invalidating the location in the table, and resetting the invalidation interval count of the invalidation interval counter.

7. The method of clause 6, wherein k=128.

8. A system for controlling dynamic random access memory (DRAM) access timing, comprising:

a table having locations configured to store DRAM row addresses; and a DRAM command manager configured to:

detect a precharge command directed to a row, and in response to detecting the precharge command store an address of a precharged row in a location in the table;

detect an activate command directed to a row, and in response to detecting the activate command determine whether an address of an activated row is in the table; and detect a read/write command, and in response to detecting the read/write command, use a first timing parameter and not a second timing parameter to access the activated row when the address of the activated row is in the table, and use the second timing parameter and not the first timing parameter to access the activated row when the address of the activated row is not in the table.

9. The system of clause 8, wherein the first timing parameter is a shorter time interval between a row activation and a row precharge, and the second timing parameter is a longer time interval between the row activation and the row precharge.

10. The system of clause 8 or 9, wherein the first timing parameter is a shorter time interval between a row activation and a row read/write access, and the second timing parameter is a longer time interval between the row activation and the row read/write access.

11. The system of any of clauses 8-10, further comprising an invalidation controller configured to invalidate the address of the precharged row in the table after a time interval.

12. The system of clause 11, wherein the invalidation controller is configured to invalidate each location in the table every C processor cycles, where C is a number corresponding to an amount of time the precharged row remains charged above a threshold.

13. The system of clause 12, wherein the invalidation controller comprises: an entry counter;

an invalidation counter configured to increment an invalidation interval count on each processor cycle; and invalidation control circuitry configured to compare the invalidation interval count with a value C/k, wherein the table consists of k locations and, when the invalidation interval count is equal to C/k, invalidate the location in the table indicated by an entry count of the entry counter, increment the entry counter after invalidating the location in the table, and reset the invalidation counter.

14. The system of clause 13, wherein k=128.

15. A dynamic random access memory (DRAM) controller, comprising:

a DRAM storage array comprising a plurality of rows;

a command generator configured to generate DRAM commands including a precharge command, an activate command, and a read/write command;

a table having locations configured to store DRAM row addresses; and a DRAM command manager configured to detect the DRAM commands generated by the command generator and to:

in response to detecting the precharge command, store an address of a precharged row in a location in the table;

in response to detecting the activate command, determine whether an address of an activated row is in the table; and in response to detecting the read/write command, use a first timing parameter and not a second timing parameter to access the activated row when the address of the activated row is in the table, and use the second timing parameter and not the first timing parameter to access the activated row when the address of the activated row is not in the table.

16. The DRAM controller of clause 15, wherein the first timing parameter is a shorter time interval between a row activation and a row precharge, and the second timing parameter is a longer time interval between the row activation and the row precharge.

17. The DRAM controller of clause 15 or 16, wherein the first timing parameter is a shorter time interval between a row activation and a row read/write access, and the second timing parameter is a longer time interval between the row activation and the row read/write access.

18. The DRAM controller of any of clauses 15-17, wherein the DRAM command manager includes an invalidation controller configured to invalidate the address of the precharged row in the table after a time interval.

19. The DRAM controller of clause 18, wherein the invalidation controller is configured to invalidate each location in the table every C processor cycles, where C is a number corresponding to an amount of time the precharged row remains charged above a threshold.

20. The DRAM controller of clause 19, wherein the invalidation controller comprises:

an entry counter;

an invalidation counter configured to increment an invalidation count on each processor cycle; and invalidation control circuitry configured to compare the invalidation count with a value C/k, wherein the table consists of k locations and, when the invalidation count is equal to C/k, to invalidate the location in the table indicated by an entry count of the entry counter, to increment the entry counter after invalidating the location in the table, and to reset the invalidation counter.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for controlling dynamic random access memory (DRAM) access timing, comprising:

storing, based on row precharging, an address of a precharged row in a location in a table;

determining, based on row activating, whether an address of an activated row is in the table;

using a first timing parameter and not a second timing parameter to access the activated row in response to a determination the address of the activated row is in the table;

using the second timing parameter and not the first timing parameter to access the activated row in response to a determination the address of the activated row is not in the table; and invalidating the address of the precharged row in the table after a time interval, wherein invalidating comprises invalidating each location in the table every C processor cycles, where C is a number corresponding to an amount of time the precharged row remains charged above a threshold.

2. The method of claim 1, wherein the first timing parameter is a shorter time interval between a row activation and a row precharge, and the second timing parameter is a longer time interval between the row activation and the row precharge.

3. The method of claim 1, wherein the first timing parameter is a shorter time interval between a row activation and a row read/write access, and the second timing parameter is a longer time interval between the row activation and the row read/write access.

4. The method of claim 1, wherein invalidating comprises:

incrementing an invalidation interval count of an invalidation interval counter on each processor cycle;

determining whether the invalidation interval count is equal to C/k, wherein the table consists of k locations; and in response to determining the invalidation interval count is equal to C/k, invalidating the location in the table indicated by an entry count of an entry counter, incrementing the entry counter after invalidating the location in the table, and resetting the invalidation interval count of the invalidation interval counter.

5. The method of claim 4, wherein k=128.

6. A system for controlling dynamic random access memory (DRAM) access timing, comprising:

a table having locations configured to store DRAM row addresses; and a DRAM command manager configured to:

detect a precharge command directed to a row, and in response to detecting the precharge command store an address of a precharged row in a location in the table;

detect an activate command directed to a row, and in response to detecting the activate command determine whether an address of an activated row is in the table;

detect a read/write command, and in response to detecting the read/write command, use a first timing parameter and not a second timing parameter to access the activated row when the address of the activated row is in the table, and use the second timing parameter and not the first timing parameter to access the activated row when the address of the activated row is not in the table; and an invalidation controller configured to invalidate the address of the precharged row in the table after a time interval, wherein the invalidation controller is configured to invalidate each location in the table every C processor cycles, where C is a number corresponding to an amount of time the precharged row remains charged above a threshold.

7. The system of claim 6, wherein the first timing parameter is a shorter time interval between a row activation and a row precharge, and the second timing parameter is a longer time interval between the row activation and the row precharge.

8. The system of claim 6, wherein the first timing parameter is a shorter time interval between a row activation and a row read/write access, and the second timing parameter is a longer time interval between the row activation and the row read/write access.

9. The system of claim 6, wherein the invalidation controller comprises:

an entry counter;

an invalidation counter configured to increment an invalidation interval count on each processor cycle; and invalidation control circuitry configured to compare the invalidation interval count with a value C/k, wherein the table consists of k locations and, when the invalidation interval count is equal to C/k, invalidate the location in the table indicated by an entry count of the entry counter, increment the entry counter after invalidating the location in the table, and reset the invalidation counter.

10. The system of claim 9, wherein k=128.

11. A dynamic random access memory (DRAM) controller, comprising:

a DRAM storage array comprising a plurality of rows;

a command generator configured to generate DRAM commands including a precharge command, an activate command, and a read/write command;

a table having locations configured to store DRAM row addresses;

a DRAM command manager configured to detect the DRAM commands generated by the command generator and to:

in response to detecting the precharge command, store an address of a precharged row in a location in the table;

in response to detecting the activate command, determine whether an address of an activated row is in the table; and in response to detecting the read/write command, use a first timing parameter and not a second timing parameter to access the activated row when the address of the activated row is in the table, and use the second timing parameter and not the first timing parameter to access the activated row when the address of the activated row is not in the table; and the DRAM command manager includes an invalidation controller configured to invalidate the address of the precharged row in the table after a time interval, wherein the invalidation controller is configured to invalidate each location in the table every C processor cycles, where C is a number corresponding to an amount of time the precharged row remains charged above a threshold.

US 12,625,614 B2

13

14

12. The DRAM controller of claim 11, wherein the first timing parameter is a shorter time interval between a row activation and a row precharge, and the second timing parameter is a longer time interval between the row activation and the row precharge.

13. The DRAM controller of claim 11, wherein the first timing parameter is a shorter time interval between a row activation and a row read/write access, and the second timing parameter is a longer time interval between the row activation and the row read/write access.

14. The DRAM controller of claim 11, wherein the invalidation controller comprises:

an entry counter;

an invalidation counter configured to increment an invalidation count on each processor cycle; and invalidation control circuitry configured to compare the invalidation count with a value C/k, wherein the table consists of k locations and, when the invalidation count is equal to C/k, to invalidate the location in the table indicated by an entry count of the entry counter, to increment the entry counter after invalidating the location in the table, and to reset the invalidation counter.

* * * * *